(12) United States Patent
Yumoto et al.

(10) Patent No.: US 10,362,182 B2
(45) Date of Patent: Jul. 23, 2019

(54) IMAGE FORMING APPARATUS, IMAGE FORMING SYSTEM, AND IMAGE FORMING METHOD WITH SHEET FEEDING ABNORMALITY CONTROL

(71) Applicant: CANON KABUSHIKI KAISHA, Tokyo (JP)

(72) Inventors: Koji Yumoto, Toride (JP); Satoru Yamamoto, Noda (JP); Akinobu Nishikata, Matsudo (JP); Takashi Yokoya, Yoshikawa (JP); Akihiro Kawakita, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/983,541

(22) Filed: May 18, 2018

(65) Prior Publication Data
US 2018/0352096 A1    Dec. 6, 2018

(30) Foreign Application Priority Data
May 31, 2017    (JP) .................................. 2017-108334

(51) Int. Cl.
H04N 1/00    (2006.01)
G06F 3/12    (2006.01)
G03G 15/00    (2006.01)

(52) U.S. Cl.
CPC .......... *H04N 1/0032* (2013.01); *G03G 15/70* (2013.01); *G06F 3/1207* (2013.01);
(Continued)

(58) Field of Classification Search
None
See application file for complete search history.

(56) References Cited

U.S. PATENT DOCUMENTS

| 8,038,139 B2 | 10/2011 | Nishimura et al. |
| 2004/0253030 A1* | 12/2004 | Hamada ............. H04N 1/00567 399/367 |
| 2015/0368054 A1* | 12/2015 | Kowase .................. B65H 7/06 271/258.01 |

FOREIGN PATENT DOCUMENTS

| JP | 04032442 A | * | 2/1992 |
| JP | 05077966 A | * | 3/1993 |

(Continued)

OTHER PUBLICATIONS

U.S. Appl. No. 15/985,994, Akihiro Kawakita Satoru Yamamoto Koji Yumoto Akinobu Nishikata Takashi Yokoya, May 22, 2018.

(Continued)

*Primary Examiner* — Thomas D Lee
(74) *Attorney, Agent, or Firm* — Venable LLP

(57) ABSTRACT

An image forming apparatus transmits a sheet feeding request to the sheet feeding device, obtains a sheet through a receiving device and performs image formation on the sheet. The receiving device comprises an inlet sensor for detecting a sheet fed from the sheet feeding device. The image forming apparatus transmits the sheet feeding request to the sheet feeding device again in a case where the inlet sensor does not detect a sheet within a predetermined time after the sheet feeding device starts to feed a sheet and no signal indicating an abnormality with regard to a sheet is received from the sheet feeding device. If the number of times the sheet feeding request is transmitted exceeds a predetermined number of times, the image forming apparatus stops operation.

14 Claims, 8 Drawing Sheets

(52) U.S. Cl.
CPC ....... *G06F 3/1259* (2013.01); *H04N 1/00649* (2013.01); *H04N 1/00663* (2013.01)

(56) References Cited

FOREIGN PATENT DOCUMENTS

| | | | |
|---|---|---|---|
| JP | 2008304603 A | * | 12/2008 |
| JP | 2010-241529 A | | 10/2010 |

OTHER PUBLICATIONS

U.S. Appl. No. 15/991,015, Takashi Yokoya Akinobu Nishikata Satoru Yamamoto Koji Yumoto Akihiro Kawakita, May 29, 2018.

* cited by examiner

IMAGE FORMING APPARATUS, IMAGE FORMING SYSTEM, AND IMAGE FORMING METHOD WITH SHEET FEEDING ABNORMALITY CONTROL

BACKGROUND OF THE INVENTION

Field of the Invention

The present disclosure relates to sheet feeding control technology for an image forming apparatus.

Description of the Related Art

An image forming system configured by connecting a sheet feeding device for feeding a sheet to an image forming apparatus is known. In the image forming system, when a sheet is delivered between the sheet feeding device and the image forming apparatus, a delivery command is transmitted from the sheet feeding device to the image forming apparatus. Generally, sheet conveyance control is performed using the delivery command as a reference. The image forming apparatus is equipped with a sensor at a position where the sheet is delivered from the sheet feeding device. The image forming apparatus detects arrival of the sheet by the sensor. If the sensor detects the arrival of the sheet while no delivery command is received, the image forming apparatus determines that a communication error has occurred. In this case, the image forming apparatus performs the sheet conveyance control using a detection result of the sensor as a reference (Japanese Patent Application Laid-open No. 2010-241529).

The sheet feeding device is equipped with a sensor for detecting an abnormality therein. If an abnormality occurs in the device, the sheet feeding device notifies the image forming apparatus of the occurrence of the abnormality. If the occurrence of the abnormality is notified by the sheet feeding device, the image forming apparatus does not send a sheet feeding job to the sheet feeding apparatus. However, if a sensor for the sheet feeding device or a communication interface to the image forming apparatus fails, even if the abnormality occurs in the sheet feeding device, the image forming apparatus cannot confirm the abnormality. In this case, the image forming apparatus recognizes that the sheet feeding device is normal and sends the sheet feeding job to the sheet feeding device.

In this case, even if the sheet feeding job is instructed, the sheet feeding device cannot perform normal sheet feeding. The image forming apparatus detects that the sheet has not arrived yet by the sensor provided at a position where the sheet is delivered. Thus, the image forming apparatus determines that the sheet feeding from the sheet feeding device in a normal state is delayed so that the image forming apparatus reinstructs the sheet feeding device to feed a sheet. The reinstruction to feed a sheet by the image forming apparatus is repeated until the operator realizes the abnormality of the sheet feeding device. While the sheet feeding instruction is repeated, the image forming apparatus repeats start and end of the image forming operation. This shortens a life of consumables. The present invention can provide an image forming apparatus capable of suppressing unnecessary operation at the occurrence of the abnormality in the sheet feeding device to properly perform sheet feeding processing.

SUMMARY OF THE INVENTION

The present disclosure provides an image forming apparatus connected to a sheet feeding device, which is configured to start feeding a sheet in accordance with a sheet feeding request, and not to notify, even in a case where a conveyance abnormality of a sheet occurs during conveying operation of a sheet, the conveyance abnormality during the conveying operation, the image forming apparatus comprising: a sheet detector configured to detect the sheet received from the sheet feeding device; an image forming part configured to form an image on the received sheet based on a print job; and a controller configured to: transmit the sheet feeding request to the sheet feeding device; and transmit the sheet feeding request to the sheet feeding device again in a case where the sheet detector does not detect the sheet within a predetermined time after the sheet feeding device has started feeding a sheet and a signal indicating an abnormality with regard to a sheet is not received from the sheet feeding device, wherein the controller is further configured to control the image forming part to stop performing the print job in a case where the number of times the sheet feeding request is transmitted exceeds a predetermined number of times.

Further features of the present invention will become apparent from the following description of exemplary embodiments (with reference to the attached drawings).

DESCRIPTION OF THE EMBODIMENTS

With reference to the drawings, the image forming apparatus of the present disclosure is explained in detail.

Overall Configuration

Figure 1:
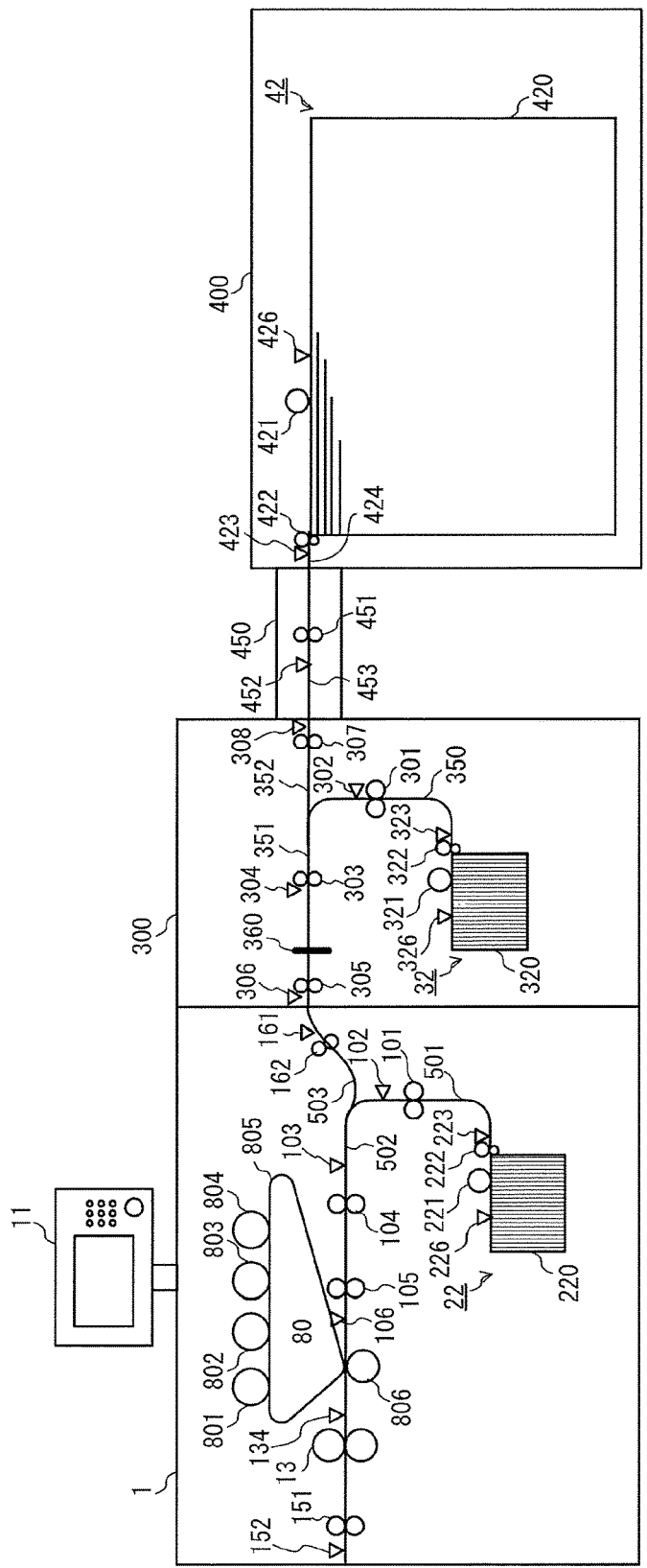
FIG. 1 is an illustration diagram of a configuration of the image forming system.

FIG. 1 is an illustration diagram of a configuration of an image forming system including the image forming apparatus of the present embodiment. The image forming system comprises an image forming apparatus 1, a receiving device 300, a registration unit 450, and a sheet feeding device 400. The sheet feeding device 400 supplies a sheet to the image forming apparatus 1 through the registration unit 450 and the receiving device 300. The receiving device 300 supplies the sheet to the image forming apparatus 1. The image forming apparatus 1 forms an image on the sheet.

Image Forming Apparatus

The image forming apparatus 1 is equipped with a user interface 11. The user interface 11, equipped with an input device operated by a user, receives an instruction such as copying and the like. The user interface 11 is equipped with an output device used to present information to the user. The user interface 11 is, for example, equipped with a plurality of keys used to set various functions related to the image formation as the input device. The user interface 11 is, for example, equipped with a display part for displaying a setting state as the output device. The user interface 11 transmits key signals which correspond to operation of each key to the image forming apparatus 1 and displays information on the display part based on the signal from the image forming apparatus 1. To form the image on the sheet, the image forming apparatus 1 is equipped with a sheet feeding part 22, an image forming part 80, a fixing part 13, various rollers used to convey the sheet, and various sensors used to detect the sheet which is conveyed.

The sheet feeding part 22 is equipped with storage 220, a paper surface sensor 226, a pickup roller 221, and a sheet feeding roller 222. A plurality of sheets can be placed in the storage 220. In the storage 220, a position of an uppermost sheet is controlled so that a sheet located on the top (uppermost sheet) is brought into contact with the pickup roller 221 by a lifter motor (not shown) and the paper surface sensor 226. The pickup roller 221 sends the uppermost sheet in the storage 220 to the sheet feeding roller 222. An upper roller of the sheet feeding roller 222 rotates in a feeding direction and a lower roller of the sheet feeding roller 222 rotates in a returning direction so that the sheet feeding roller 222 separates the sheet one by one and feeds the sheet to a vertical path 501. By receiving an image forming instruction from the user interface 11, the image forming apparatus 1 starts sheet feeding by the sheet feeding part 22.

The vertical path 501 is equipped with a sheet feeding sensor 223, a sheet feeding vertical path roller 101, and a path sensor 102. The sheet feeding sensor 223 detects the sheet fed to the vertical path 501. In a case where the sheet feeding sensor 223 does not detect the sheet even after a lapse of a predetermined time or more after the sheet feeding is started (the sheet feeding sensor 223 is not turned to an ON state), the image forming apparatus 1 determines that a jam (hereinafter called "delay jam") has occurred and stops the sheet conveyance. Further, in a case where the sheet feeding sensor 223 is not turned to an OFF state even after a lapse of a predetermined time or more after the sheet feeding sensor 223 detects the sheet, the image forming apparatus 1 determines that a jam (hereinafter called "stay jam") has occurred and stops the sheet conveyance. The sheet feeding vertical path roller 101 conveys the sheet fed to a horizontal path 502. The path sensor 102 detects the sheet which is conveyed from the vertical path 501 to the horizontal path 502.

The horizontal path 502 is equipped with a pre-registration sensor 103, a pre-registration roller 104, a registration roller 105, a registration sensor 106, a path sensor 134, a sheet delivery roller 151, and a path sensor 152. A secondary transfer part 806 (described later), equipped with the image forming part 80, is provided between the registration sensor 106 and the path sensor 134. The fixing part 13 is provided between the path sensor 134 and the sheet delivery roller 151. The pre-registration sensor 103, the registration sensor 106, the path sensor 134, and the path sensor 152 detect the sheet which is conveyed along the horizontal path 502.

As for the sheet conveyed to the horizontal path 502, its front end in the conveying direction is aligned with a front end of the image to be formed in the image forming part 80. The alignment is performed by the pre-registration sensor 103, the pre-registration roller 104, the registration roller 105, and the registration sensor 106. For example, the alignment of the front end of the image and the front end of the sheet is performed by driving the registration roller 105 based on a signal which is synchronized with the image formation.

The image forming part 80 is equipped with photosensitive drums 801 through 804 which are photoreceptors, an intermediate transfer body 805, and the secondary transfer part 806. In the photosensitive drums 801 through 804, images of different colors are respectively formed. The images of each color are transferred to the intermediate transfer body 805 from the photosensitive drums 801 through 804. The intermediate transfer body 805 conveys the image transferred to the secondary transfer part 806 by rotation. The secondary transfer part 806 transfers the image on the intermediate transfer body 805 to the sheet conveyed along the horizontal path 502.

The sheet to which the image is transferred is conveyed to the fixing part 13. By heating and pressurizing the sheet, the fixing part 13 fixes the image to the sheet. The image is formed on the sheet in the above mentioned manner. The sheet on which the image is fixed is conveyed to the sheet delivery roller 151. The sheet delivery roller 151 discharges the sheet on which the image is formed outside the image forming apparatus 1. Thus, the image forming processing on the sheet ends.

The image forming apparatus 1 is equipped with a conveyance path 503 used to guide the sheet supplied from the receiving device 300 to the horizontal path 502. The conveyance path 503 is equipped with a receiving sensor 161 and a receiving roller 162. The receiving sensor 161 detects the sheet delivered from the receiving device 300. The receiving roller 162 conveys the sheet delivered from the receiving device 300 to the horizontal path 502 from the conveyance path 503.

In a case where the receiving sensor 161 does not detect the sheet even after a lapse of a predetermined time or more after the delivery of the sheet is notified from the receiving device 300 (the receiving sensor 161 is not turned to an ON state), the image forming apparatus 1 determines that the delay jam has occurred and stops the sheet conveyance. Further, in a case where the receiving sensor 161 is not turned to an OFF state even after a lapse of a predetermined time or more after the receiving sensor 161 detects the sheet, the image forming apparatus 1 determines that the stay jam has occurred and stops the sheet conveyance.

Receiving Device

The receiving device 300 is equipped with a sheet feeding part 32, various rollers used to convey the sheet, and various sensors used to detect the sheet which is conveyed. The sheet feeding part 32 is equipped with storage 320, a paper surface sensor 326, a pickup roller 321, and a sheet feeding roller 322. A plurality of sheets can be placed in the storage 320. Operation to feed the sheet from the storage 320 to a vertical path 350 one by one is similar to the operation of the sheet feeding part 22 of the image forming apparatus 1 so that the description thereof is omitted.

The vertical path 350 is equipped with a sheet feeding sensor 323, a sheet feeding vertical path roller 301, and a path sensor 302. The sheet feeding sensor 323 detects the sheet fed to the vertical path 350. In a case where the sheet feeding sensor 323 does not detect the sheet (the sheet feeding sensor 323 is not turned to an ON state) even after a lapse of a predetermined time or more after the sheet feeding is started, the receiving device 300 determines that the delay jam has occurred and stops the sheet conveyance. Further, in a case where the sheet feeding sensor 323 is not turned to an OFF state even after a lapse of a predetermined time or more after the sheet feeding sensor 323 detects the sheet, the receiving device 300 determines that the stay jam has occurred and stops the sheet conveyance. The sheet feeding vertical path roller 301 conveys the sheet fed to a horizontal path 351. The path sensor 302 detects the sheet which is conveyed from the vertical path 350 to the horizontal path 351.

The horizontal path 351 is equipped with a horizontal path roller 303, a path sensor 304, a delivery roller 305, and a delivery sensor 306. The path sensor 304 and the delivery sensor 306 detect the sheet which is conveyed along the horizontal path 351. When the sheet guided to the horizontal path 351 is detected by the path sensor 304, the sheet temporarily stops at a position conveyed by a predetermined distance by the horizontal path roller 303. For example, the sheet is conveyed until a top of the sheet in the conveying direction arrives at a standby position 360 and then stops. Regardless of a sheet size, the standby position 360 is the same position.

The horizontal path roller 303 resumes conveyance of the sheet having stopped at the standby position 360 at predetermined timing. The delivery roller 305 delivers the sheet having resumed the conveyance to the image forming apparatus 1. By detecting, by the delivery sensor 306, a rear end of the sheet in the conveying direction, the receiving device 300 detects that the delivery of the sheet is completed. The rear end of the sheet is detected when a detection result of the delivery sensor 306 turns from an ON state to an OFF state. The predetermined timing to resume the sheet conveyance is, for example, timing when the sheet arrives at the secondary transfer part 806 in accordance with timing when the image formed in the image forming part 80 of the image forming apparatus 1 arrives at the secondary transfer part 806.

The receiving device 300 is equipped with a conveyance path 352 for guiding a sheet supplied from the sheet feeding device 400 through the registration unit 450 to the horizontal path 351. The conveyance path 352 is equipped with an inlet sensor 308 and an inlet roller 307. The inlet sensor 308 detects the sheet delivered from the registration unit 450. The inlet roller 307 conveys the sheet delivered from the registration unit 450 to the horizontal path 351 from the conveyance path 352.

In a case where the inlet sensor 308 does not detect the sheet (the inlet sensor 308 is not turned to an ON state) even after a lapse of a predetermined time or more after the delivery of the sheet is notified from the sheet feeding device 400, the receiving device 300 determines that abnormality has occurred in the sheet feeding device 400 and stops the sheet conveyance. Further, in a case where the receiving sensor 161 is not turned to an OFF state even after a lapse of a predetermined time or more after the receiving sensor 161 detects the sheet, the receiving device 300 determines that the stay jam has occurred and stops the sheet conveyance.

Sheet Feeding Device and Registration Unit

The sheet feeding device 400 and the registration unit 450 are not genuine sheet feeding devices of a manufacturing company of the image forming apparatus 1 and the receiving device 300, but they are generic sheet feeding devices. For that reason, the sheet feeding device 400 and the registration unit 450 cannot perform detailed communication such as the communication between the image forming apparatus 1 and the receiving device 300 but can only perform generic communication. The sheet feeding device 400 is equipped with a sheet feeding part 42, various rollers used to convey the sheet, and various sensors used to detect the sheet which is conveyed. The sheet feeding part 42 is equipped with storage 420, a paper surface sensor 426, a pickup roller 421, and a sheet feeding roller 422. A plurality of sheets can be placed in the storage 420. Operation to feed the sheet from the storage 420 to a conveyance path 424 one by one is similar to the operation of the sheet feeding part 22 of the image forming apparatus 1 so that the description thereof is omitted.

The conveyance path 424 is equipped with a sheet feeding sensor 423. The sheet feeding sensor 423 detects the sheet remaining on the conveyance path 424 in a standby state where no sheet is fed. The sheet is conveyed along the conveyance path 424 and delivered to the registration unit 450.

The registration unit 450 is equipped with a registration conveyance roller 451 and a path sensor 452 on a conveyance path 453 connected to the conveyance path 424 of the sheet feeding device 400. The registration conveyance roller 451 conveys the sheet delivered from the sheet feeding device 400 to the receiving device 300. The path sensor 452 detects the sheet remaining on the conveyance path 453 in a standby state where no sheet is fed. The registration unit 450 corrects skew and lateral dislocation of the sheet by a correction part (not shown) while the sheet is being conveyed along the conveyance path 453 by the registration conveyance roller 451 and delivers the sheet to the receiving device 300.

Control System

Figure 2:
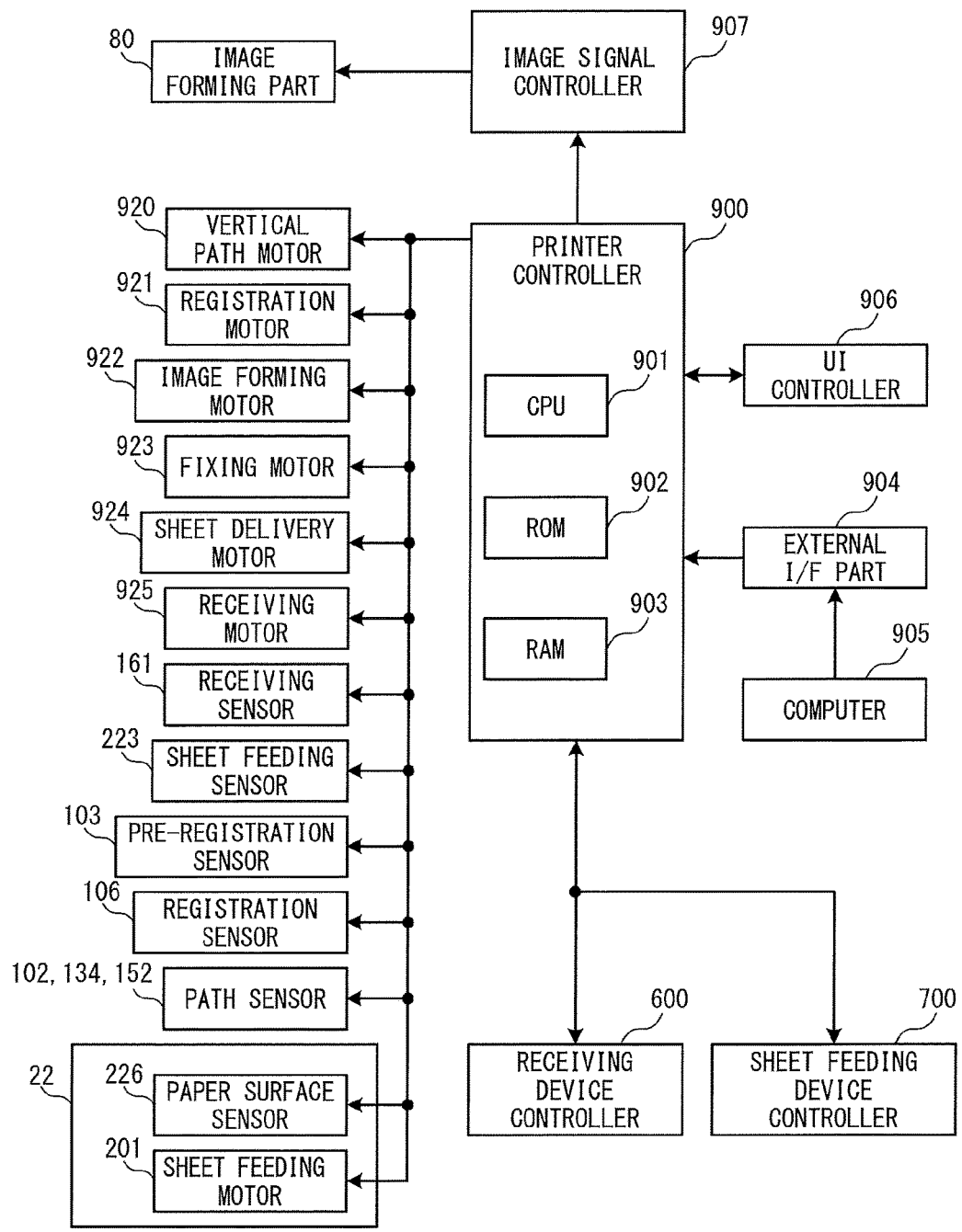
FIG. 2 is a configuration diagram of a controller.

FIG. 2 is a configuration diagram of a controller used to control overall operation of the image forming system. The controller is provided with a printer controller 900. The printer controller 900 is provided in the image forming apparatus 1. The printer controller 900 is a computer comprising a central processing unit (CPU) 901, a read only memory (ROM) 902 and a random access memory (RAM) 903. The CPU 901 controls operations of each part of the image forming system by performing a computer program stored in the ROM 902 using the RAM 903 as a work area. An image signal controller 907, a user interface (UI) controller 906, an external I/F part 904, motors used to drive various rollers used to convey the sheet, and various sensors provided in the image forming apparatus 1 are connected to the printer controller 900. The printer controller 900 is connected in a communicable manner between a receiving device controller 600 and a sheet feeding device controller 700 which are described later.

The external I/F part 904 is an interface with a computer 905 which is an external device. The image signal controller 907 converts digital image signals input from the computer 905 through the external I/F part 904 into video signals by performing various processing to the digital image signals. The image signal controller 907 then transmits the converted video signals to the image forming part 80. The image forming part 80 performs image formation in accordance with the video signals. The image signal controller 907 receives an instruction input from the computer 905 through the external I/F part 904. The UI controller 906 receives an instruction input from the user interface 11 and transmits the instruction to the printer controller 900. The UI controller 906 causes the user interface 11 to present information by the control of the printer controller 900.

The printer controller 900 performs conveyance control of the sheet in the image forming apparatus 1 by the motors used to drive various rollers and in accordance with detection results of various sensors.

A sheet feeding motor 201 drives the pickup roller 221. A vertical path motor 920 drives the sheet feeding roller 222 and the sheet feeding vertical path roller 101. The sheet feeding motor 201 and the vertical path motor 920 are drive sources used to convey the sheet from the sheet feeding part 22 to the horizontal path 502. A registration motor 921 drives the pre-registration roller 104 and the registration roller 105. The registration motor 921 is a drive source used to convey the sheet to the secondary transfer part 806.

An image forming motor 922 is a drive source used to drive the photosensitive drums 801 through 804, the intermediate transfer body 805 and the secondary transfer part 806 in the image forming part 80. The image forming motor 922 drives the image forming part 80 when forming the image on the photosensitive drums 801 through 804 and conveying the image to the secondary transfer part 806. A fixing motor 923 is a drive source used to drive the fixing part 13. The fixing motor 923 drives the fixing part 13 when fixing the image to the sheet. A sheet delivery motor 924 is a drive source used to drive the sheet delivery roller 151 and discharges the sheet outside by the sheet delivery roller 151.

A receiving motor 925 is a drive source used to drive the receiving roller 162 and convey the sheet delivered from the receiving device 300 to the horizontal path 502. When the sheet is delivered from the receiving device 300, the printer controller 900 receives a delivery notice from the receiving device controller 600 equipped with the receiving device 300. The printer controller 900 drives the receiving motor 925 in accordance with timing of receiving the delivery notice.

The printer controller 900 obtains detection results of the receiving sensor 161, the sheet feeding sensor 223, the pre-registration sensor 103, the registration sensor 106, the path sensors 102, 134, and 152, and the paper surface sensor 226. By controlling the drive of each motor in accordance with the detection results of each sensor, the printer controller 900 performs the conveyance control of the sheet. Further, the printer controller 900 detects the occurrence of a conveyance abnormality during the conveying operation by the detection results of each sensor. Further, when the sheet feeding is performed from the sheet feeding device 400, the printer controller 900 transmits a sheet feeding request to the sheet feeding device 400.

Figure 3:
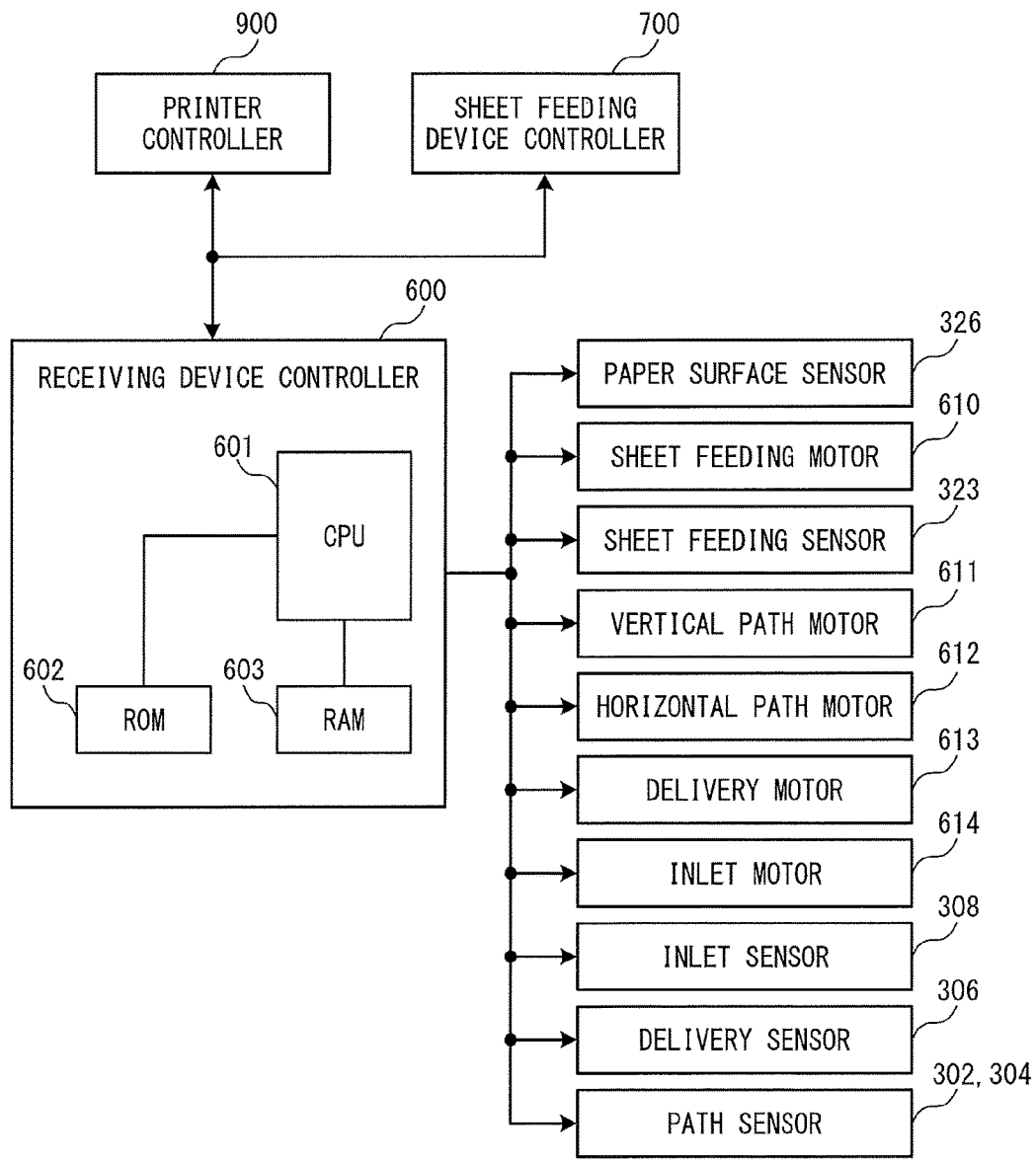
FIG. 3 is a configuration diagram of a receiving device controller.

FIG. 3 is a configuration diagram of the receiving device controller 600 used to control operation of the receiving device 300. The receiving device controller 600 is provided in the receiving device 300. The receiving device controller 600 is a computer comprising a CPU 601, a ROM 602, and a RAM 603. The receiving device controller 600 is communicable between the printer controller 900 and the sheet feeding device controller 700. The CPU 601 controls operations of each part of the receiving device 300 by performing a computer program stored in the ROM 602 using the RAM 603 as a work area. Motors used to drive various rollers for conveying the sheet and various sensors provided in the receiving device 300 are connected to the receiving device controller 600. The receiving device controller 600 performs conveyance control of the sheet in the receiving device 300 by the motors used to drive various rollers and in accordance with detection results of various sensors.

A sheet feeding motor 610 drives the pickup roller 321. A vertical path motor 611 drives the sheet feeding roller 322 and the sheet feeding vertical path roller 301. The sheet feeding motor 610 and the vertical path motor 611 are drive sources used to convey the sheet from the sheet feeding part 32 to the horizontal path 351. A horizontal path motor 612 drives the horizontal path roller 303. The horizontal path motor 612 is a drive source used to convey the sheet on the horizontal path 351. A delivery motor 613 drives the delivery roller 305. The delivery motor 613 is a drive source used to deliver the sheet to the image forming apparatus 1.

An inlet motor 614 is a drive source used to drive the inlet roller 307 and convey the sheet delivered from the sheet feeding device 400 through the registration unit 450 to the horizontal path 351. When the sheet is delivered from the registration unit 450, the receiving device controller 600 receives a delivery notice from the sheet feeding device controller 700 equipped with the sheet feeding device 400. The receiving device controller 600 drives the inlet motor 614 in accordance with timing of receiving the delivery notice.

The receiving device controller 600 obtains detection results of the inlet sensor 308, the sheet feeding sensor 323, the path sensors 302 and 304, the delivery sensor 306, and the paper surface sensor 326. By controlling the drive of each motor in accordance with the detection results of each sensor, the receiving device controller 600 performs conveyance control of the sheet. Further, the receiving device controller 600 detects the occurrence of the conveyance abnormality during the conveying operation by the detection results of each sensor.

Figure 4:
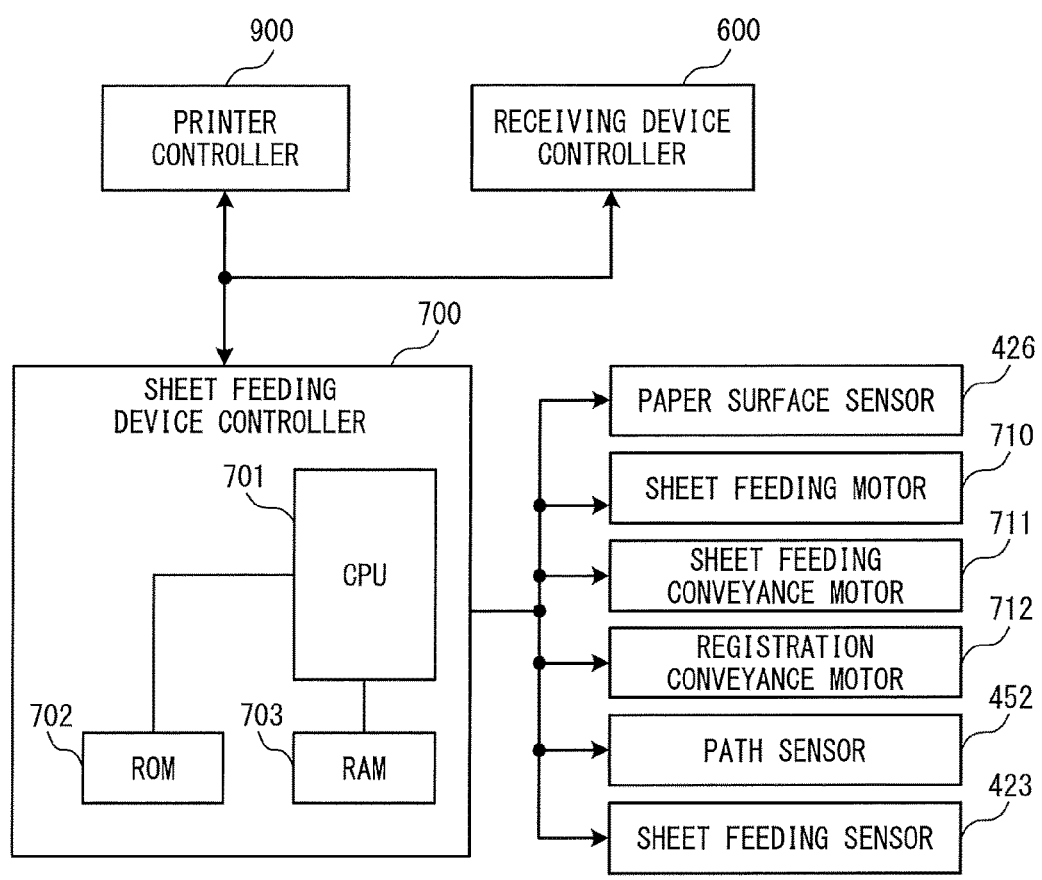
FIG. 4 is a configuration diagram of a sheet feeding device controller.

FIG. 4 is a configuration diagram of the sheet feeding device controller 700 which controls operations of the sheet feeding device 400 and the registration unit 450. The sheet feeding device controller 700 is provided in the sheet feeding device 400. The sheet feeding device controller 700 is a computer comprising a CPU 701, a ROM 702, and a RAM 703. The sheet feeding device controller 700 is communicable between the printer controller 900 and the receiving device controller 600. The CPU 701 controls operations of each part of the sheet feeding device 400 and the registration unit 450 by performing a computer program stored in the ROM 702 using the RAM 703 as a work area. Motors used to drive various rollers for conveying the sheet and various sensors provided in the sheet feeding device 400 and the registration unit 450 are connected to the sheet feeding device controller 700. Using the motors used to drive various rollers, the sheet feeding device controller 700 performs the conveyance control of the sheet in the sheet feeding device 400 and the registration unit 450.

A sheet feeding motor 710 drives the pickup roller 421. The sheet feeding conveyance motor 711 drives the sheet feeding roller 422. The sheet feeding motor 710 and the sheet feeding conveyance motor 711 are drive sources used to convey the sheet from the sheet feeding part 42 to the registration unit 450. A registration conveyance motor 712 drives the registration conveyance roller 451. The registration conveyance motor 712 is a drive source used to deliver the sheet obtained from the sheet feeding device 400 to the receiving device 300.

The sheet feeding device controller 700 obtains detection results of the sheet feeding sensor 423, the path sensor 452, and the paper surface sensor 426. The sheet feeding device controller 700 detects the sheet remaining on the conveyance paths 424 and 453 from the detection results of the sheet feeding sensor 423 and the path sensor 452 in a standby state where no sheet feeding operation is performed.

In the image forming system with the above mentioned configuration, the sheet is supplied to the image forming apparatus 1 from the sheet feeding device 400 through the registration unit 450 and the receiving device 300. In this case, in a series of a sheet conveyance path from the sheet feeding device 400 to the image forming device 1, an abnormality such as a jam sometimes occurs. Particular processing at the occurrence of the abnormality is described in the following.

Detecting Abnormality of Sheet Feeding Device 400

The sheet feeding device controller 700 is capable of detecting an abnormality which occurs in the sheet feeding device 400 and the registration unit 450 by the detection results of each sensor equipped with the sheet feeding device 400 and the registration unit 450. For example, by the detection results of the sheet feeding sensor 423 and the path sensor 425, the sheet feeding device controller 700 is capable of detecting the occurrence of the stay jam in the sheet feeding device 400 and the registration unit 450. The sheet feeding device controller 700 is capable of detecting absence of the sheet in the storage 420 of the sheet feeding part 42 by the detection result of the paper surface sensor 426. The jam and the absence of the sheet are the examples of the abnormality which occur in the sheet feeding device 400. If the sheet feeding device controller 700 detects the abnormality in one of the sheet feeding device 400 and the registration unit 450, the sheet feeding device controller 700 transmits an abnormality detection notice to the printer controller 900 and the receiving device controller 600 using a communication path used exclusively for the abnormality notice. It is noted that the communication path for the abnormality notice is different from the communication path for the delivery notice and the sheet feeding request. By the abnormality detection notice, the printer controller 900 and the receiving device controller 600 can know the occurrence of the abnormality in the sheet feeding device 400 or the registration unit 450.

After the image forming system is initialized and when it is in a standby state, the sheet feeding device 400 is capable of detecting that the sheet remains by the sheet feeding sensor 423 and the path sensor 452. In this case, the sheet feeding device 400 notifies the printer controller 900 and the receiving device controller 600 of its state where the sheet feeding device 400 cannot feed the sheet due to the remaining of the sheet. However, the sheet feeding device 400 in the present embodiment is configured so as not to allow detecting the conveyance abnormality of the sheet using these sensors during a print job. For that reason, even if the conveyance abnormality occurs in the sheet feeding device 400 during the print job, the sheet feeding device 400 cannot notify the printer controller 900 and the receiving device controller 600 of the conveyance abnormality. The conveyance abnormality of the sheet which occurs in the sheet feeding device 400 during the print job will be detected by the detection result of the inlet sensor 308 of the receiving device 300.

If the abnormality detection notice is transmitted from the sheet feeding device controller 700, the printer controller 900 does not start image forming processing even if it is instructed. If a solution of an abnormal state of the sheet feeding device 400 is notified from the sheet feeding device controller 700, the printer controller 900 can start the image forming processing. The solution of the abnormal state is determined when transmission of the abnormality detection notice is stopped.

Processing of Receiving Device 300 and Image Forming Apparatus 1

In a case where the inlet sensor 308 does not detect the sheet by predetermined receiving timing (delay), the receiving device controller 600 determines that it is not the abnormality of the inlet of the receiving device 300 but the abnormality of the sheet feeding device 400. In this case, the receiving device controller 600 interrupts the operation of the receiving device 300 and stands by in a state ready to resume the operation immediately after the abnormality of the sheet feeding device 400 is solved. Further, the printer controller 900 also interrupts the operation of the image forming apparatus 1 in this case and stands by in a state ready to resume the operation immediately after the abnormality of the sheet feeding device 400 is solved. This eliminates necessity of performing initialization operation of the entire image forming system after the abnormality of the sheet feeding device 400 is solved so that the image forming processing is promptly resumed. Operation to interrupt the operation at the occurrence of the abnormality and promptly resume the operation after the abnormality is solved is referred to as "retry operation".

A precondition of the retry operation is that the abnormal detection of the sheet feeding device 400 is surely performed and the operation is correctly interrupted. In a case where a device for detecting abnormality such as a sheet feeding sensor 432 of the sheet feeding device 400, the path sensor 452 and the like or a device for communication of the sheet feeding device 400 fails, the sheet feeding device controller 700 cannot detect or notify the abnormality even if the abnormality occurs in the sheet feeding device 400 during the print job. For that reason, the sheet feeding device controller 700 never outputs the abnormality detection notice relating to the conveyance abnormality during the print job.

In this case, the image forming apparatus 1 and the receiving device 300 receive no abnormality detection notice so that they cannot know the occurrence of the abnormality in the sheet feeding device 400. As a result, the image forming apparatus 1 and the receiving device 300 continue the processing. Thereafter, the abnormality of the sheet feeding device 400 is detected by the receiving device 300. The operations of the image forming apparatus 1 and the receiving device 300 are then interrupted. However, as the printer controller 900 obtains no abnormality detection notice from the sheet feeding device controller 700, the printer controller 900 immediately resumes the operation. Such retry operation is repeated afterward. Repetition of the retry operation consumes the components of the image forming apparatus 1 and the receiving device 300.

Sheet Conveyance Processing

Figure 5:
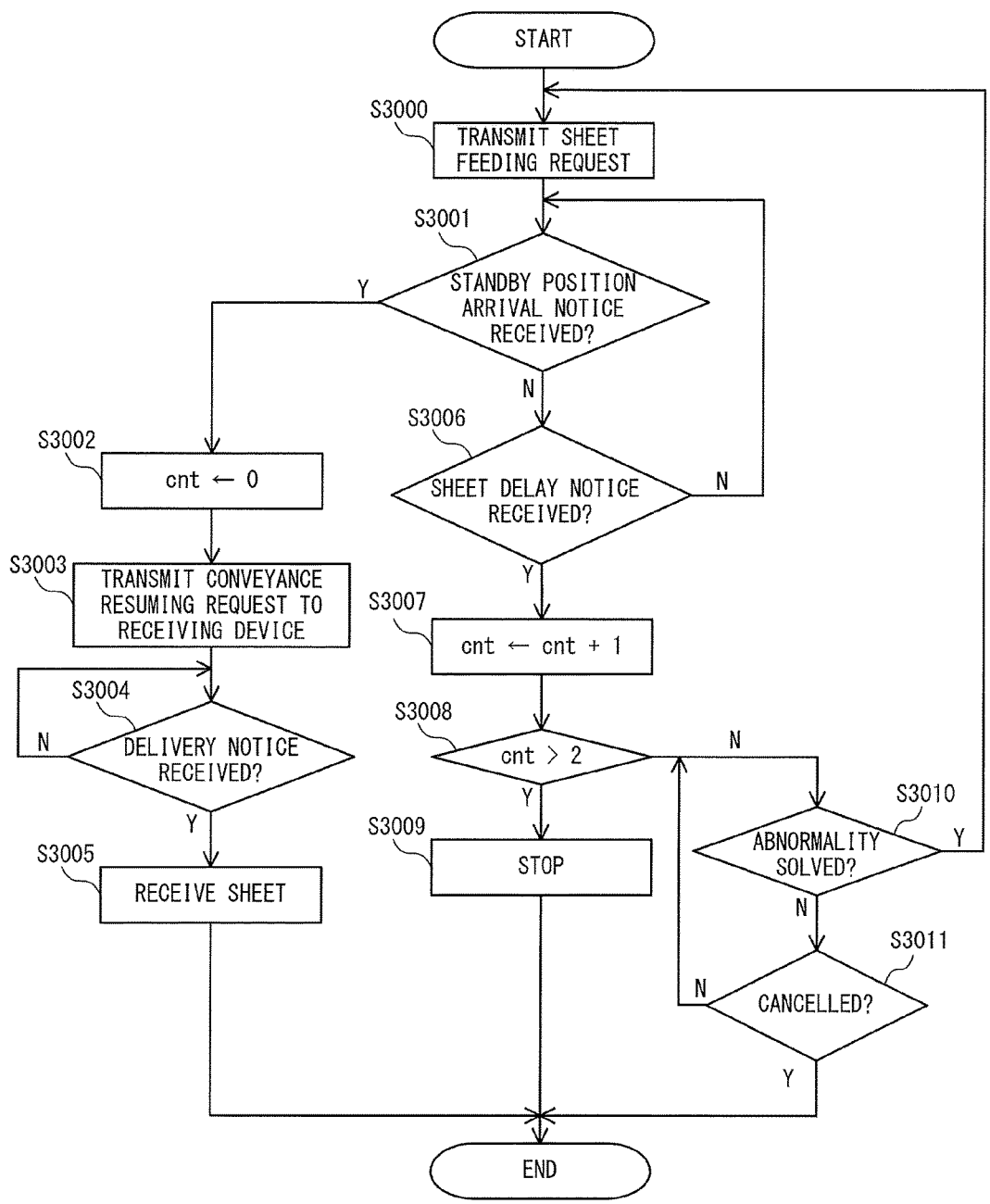
FIG. 5 is a flowchart representing processing in conveying the sheet.

FIG. 5 is a flowchart representing processing in conveying the sheet in the image forming apparatus 1. In this processing, the image forming apparatus 1 transmits a sheet feeding request to the sheet feeding device 400 and receives the sheet through the receiving device 300.

The printer controller 900 transmits a sheet feeding request to the sheet feeding device controller 700 (Step S3000). The printer controller 900 determines whether or not a standby position arrival notice representing that the sheet arrives at the standby position 360 is received from the receiving device controller 600 (Step S3001). In response to the sheet feeding request, the sheet feeding device 400 starts to feed a sheet. If no conveyance abnormality occurs, the sheet fed is conveyed from the sheet feeding device 400 to the receiving device 300. The receiving device 300 conveys the sheet to the standby position 360. By detecting that the sheet is conveyed to the standby position 360, the receiving device controller 600 transmits the standby position arrival notice to the printer controller 900.

If it is determined that the standby position arrival notice is received (Step S3001: Y), the printer controller 900 zero clears a count value cnt representing the number of times the retry operation is performed (Step S3002). An initial value of the count value cnt is cleared at startup so that its initial value is zero. The printer controller 900 transmits a conveyance resuming request of the sheet to the receiving device controller 600 (Step S3003). The receiving device controller 600 receives the conveyance resuming request from the printer controller 900 and resumes the conveyance of the sheet which stands by at the standby position 360.

After transmitting the conveyance resuming request, the printer controller 900 waits for the delivery notice from the receiving device controller 600 (Step S3004: N). The receiving device controller 600 transmits the delivery notice to the printer controller 900 when, for example, the delivery sensor 306 detects the rear end of the sheet. It means that the receiving device controller 600 transmits the delivery notice to the printer controller 900 when the detection result of the delivery sensor 306 turns from a state of detecting the sheet (ON) to a state of detecting no sheet (OFF). If the delivery notice is received (Step S3004: Y), the printer controller 900 confirms the delivery of the sheet from the receiving device 300 (Step S3005). When the receiving sensor 161 detects the sheet, the printer controller 900 can confirm that the sheet is delivered. The printer controller 900 having confirmed the delivery of the sheet controls each motor and the operation of the image forming part 80 to form the image on the sheet.

If it is determined that the standby position arrival notice is not received (Step S3001: N), the printer controller 900 determines whether or not a sheet delay notice is received from the receiving device controller 600 (Step S3006). In a case where timeout occurs at the inlet sensor 308 due to a conveyance delay of the sheet, the receiving device controller 600 transmits the sheet delay notice to the printer controller 900. In a case where the inlet sensor 308 does not detect the sheet within a predetermined time after the sheet feeding request is transmitted to the sheet feeding device controller 700, the receiving device controller 600 determines that the timeout has occurred due to the conveyance delay of the sheet. If it is determined that the sheet delay notice is not received (Step S3006: N), the printer controller 900 determines whether or not the standby position arrival notice is received (Step S3001). It means that the printer controller 900 repeats the processing of the steps S3001 and S3006 until it receives the standby position arrival notice or the sheet delay notice.

If it is determined that the sheet delay notice is received (Step S3006: Y), the printer controller 900 adds 1 to the count value cnt of the number of retrying times (Step S3007). The printer controller 900 determines whether or not the count value cnt after the addition exceeds "2" (Step S3008). If it is determined that the count value cnt exceeds "2" (Step S3008: Y), the printer controller 900 determines that two retry operations are performed. During the two retry operations, the sheet does not normally arrive at the standby position 360 of the receiving device 300. For that reason, the printer controller 900 determines that at least one of the sheet feeding sensor 423 and the path sensor 452 for detecting the abnormality of the sheet feeding device 400 or a communication path for the abnormality detection notice fails and stops the operation of the image forming apparatus 1 (Step S3009). For example, the printer controller 900 stops the operation of the image forming part 80. The printer controller 900 also instructs the receiving device controller 600 to stop the operation of the receiving device 300. It is noted that in the present embodiment, the number of times of the retry operation is defined as two times, but this number of times may be a value of three times or more. In this case, the printer controller 900 determines that the sheet feeding device 400 fails and may present the failure of the sheet feeding device 400 through the user interface 11.

If it is determined that the count value cnt does not exceed "2", (Step S3008: N), the printer controller 900 determines whether the abnormality of the sheet feeding device 400 is solved or not (Step S3010). The printer controller 900 can determine whether the abnormality of the sheet feeding device 400 is solved or not according to presence/absence of the abnormality detection notice from the sheet feeding device controller 700.

In a case where the conveyance abnormality occurs in the sheet feeding device 400 in a state where no failure occurs to the sheet feeding sensor 423, the path sensor 452, and the communication path for the abnormality detection notice, after the receiving device controller 600 detects the conveyance abnormality of the sheet feeding device 400, the sheet feeding device 400 is turned to a standby state. Thus, the sheet feeding device controller 700 notifies the receiving device controller 600 that the sheet remains. In such a state, at the step S3010, it is determined that the abnormality is not solved. If it is determined that the abnormality of the sheet feeding device 400 is not solved (Step S3010: N), the printer controller 900 confirms whether there is an input from the user interface 11 or the computer 905 to cancel the print job (Step S3011). If a job cancel is obtained from the external I/F part 904 or the UI controller 906 (Step S3011: Y), the printer controller 900 ends the processing. If no job cancel is obtained from the external I/F part 904 or the UI controller 906 (Step S3011: N), the printer controller 900 determines again whether the abnormality of the sheet feeding device 400 is solved or not (Step S3010). If it is determined that the abnormality of the sheet feeding device 400 is solved (Step S3010: Y), the printer controller 900 transmits the sheet feeding request again to the sheet feeding device controller 700 (Step S3000).

As mentioned, in a case where the sheet does not arrive at the standby position 360 of the receiving device 300 after a lapse of a predetermined time after transmitting the sheet feeding request and the abnormality of the sheet feeding device 400 is solved thereafter, by transmitting the sheet feeding request again, the printer controller 900 performs the retry operation. For example, in a case where the receiving device 300 receives no sheet and the abnormality with regard to the communication in the sheet feeding device 400 occurs, it seems, from the printer controller 900, that the abnormality of the sheet feeding device 400 is solved. Also, in a case where a device for detecting the abnormality such as the sheet feeding sensor 423 of the sheet feeding device 400, the path sensor 452 and the like fails, the sheet feeding device controller 700 is in a standby state and does not detect the remaining sheet. As a result, it seems, from the printer controller 900, that no abnormality occurs in the sheet feeding device 400. Thus, the printer controller 900 transmits the sheet feeding request again. However, practically, the abnormality is not solved. Thus, the receiving device 300 cannot still receive the sheet. Then, if the retry operation exceeds the predetermined number of times (here, twice), the printer controller 900 stops the print job even if the job cancel is not input.

Figure 6:
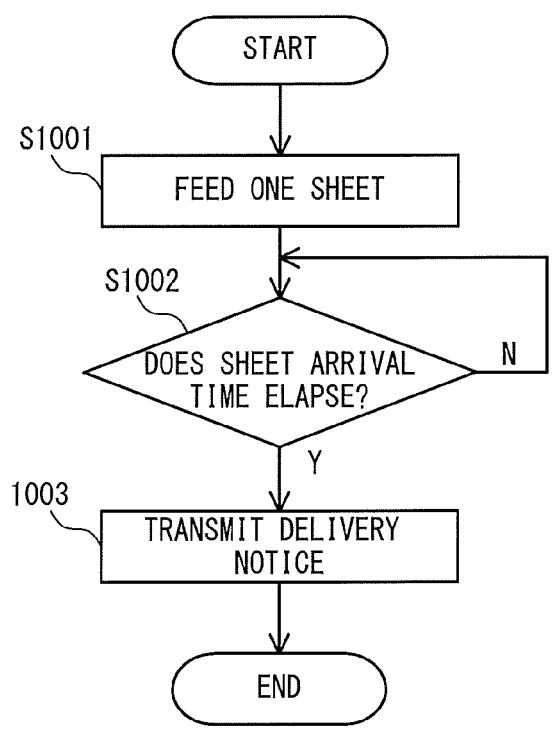
FIG. 6 is a flowchart representing processing of the sheet feeding device when a sheet feeding request is received.

FIG. 6 is a flowchart representing processing when the sheet feeding device 400 receives the sheet feeding request from the image forming apparatus 1. The processing is performed in accordance with the step S3000 in FIG. 5.

When the sheet feeding request is received from the printer controller 900, the sheet feeding device controller 700 controls the operation of the sheet feeding part 42 and feeds one sheet (Step S1001). The sheet feeding device controller 700 stands by until a sheet arrival time elapses (Step S1002: N). The sheet arrival time is a predetermined time until the sheet arrives at a position just before the sheet is delivered from the sheet feeding part 42 to the receiving device 300. When the sheet arrival time elapses (Step S1002: Y), the sheet feeding device controller 700 transmits a delivery notice for delivering the sheet to the receiving device controller 600 (Step S1003). By the delivery notice, the receiving device 300 can previously know that the sheet is delivered from the sheet feeding device 400.

Figure 7:
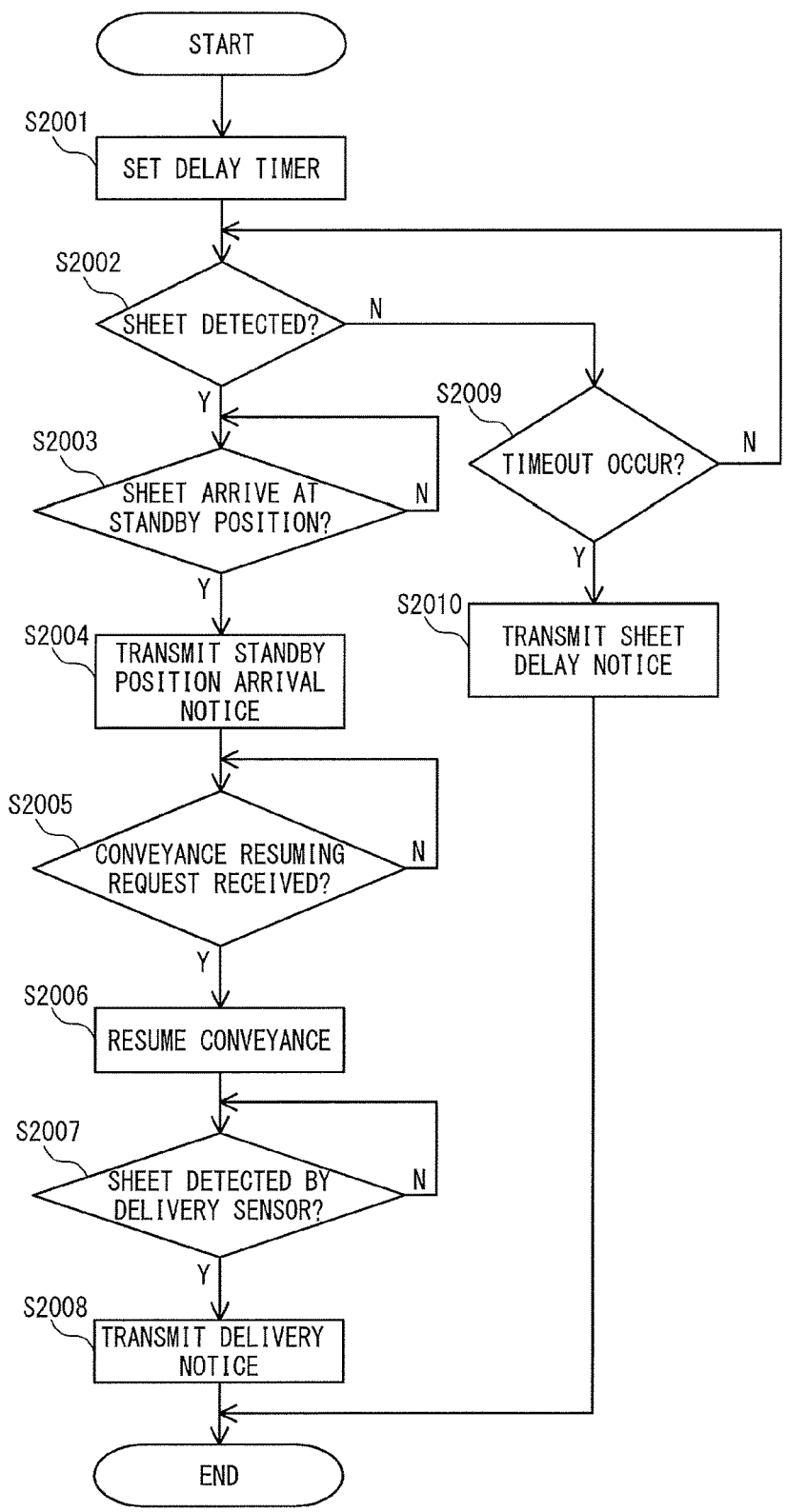
FIG. 7 is a flowchart representing processing of the receiving device when a delivery notice is received.

FIG. 7 is a flowchart representing processing when the receiving device 300 receives the delivery notice from the sheet feeding device 400. The processing is performed in accordance with the step S1003 in FIG. 6.

When the delivery notice is received from the sheet feeding device controller 700, the receiving device controller 600 sets a delay timer (Step S2001). The delay timer is a timer used to detect whether or not the conveyance of the sheet delivered from the sheet feeding device 400 is delayed a predetermined time or more. The receiving device controller 600 determines whether or not the inlet sensor 308 detects the sheet delivered from the sheet feeding device 400 (Step S2002).

If it is determined that the inlet sensor 308 detects the sheet (Step S2002: Y), the receiving device controller 600 stands by until the sheet arrives at the standby position 360 (Step S2003: N). The receiving device controller 600 determines that the sheet arrives at the standby position 360 when, for example, the horizontal path motor 612 which drives the horizontal path roller 303 drives for a predetermined time after the path sensor 304 detects the sheet. If the sheet arrives at the standby position 360 (Step S2003: Y), the receiving device controller 600 transmits the standby position arrival notice to the printer controller 900 (Step S2004). The receiving device controller 600 having transmitted the standby position arrival notice stands by until it receives the conveyance resuming request from the printer controller 900 (Step S2005: N).

If the conveyance resuming request is received (Step S2005: Y), the receiving device controller 600 resumes the conveyance of the sheet which stands by at the standby position 360 (Step S2006). The receiving device controller 600 stands by until the delivery sensor 306 detects the sheet (Step S2007: N). If the delivery sensor 306 detects the sheet (Step S2007: Y), the receiving device controller 600 transmits the delivery notice for delivering the sheet to the printer controller 900 (Step S2008). If the sheet is normally conveyed, the above mentioned processing is performed.

If it is determined that the inlet sensor 308 does not detect the sheet (Step S2002: N), the receiving device controller 600 confirms presence/absence of occurrence of timeout due to a sheet delay (Step S2009). The receiving device controller 600 determines the occurrence of the timeout due to the sheet delay depending on whether or not the delay timer set in the processing of the step S2001 has elapsed a predetermined time or more. If it is confirmed that no timeout occurs (Step S2009: N), the receiving device controller 600 continuously determines whether the inlet sensor 308 detects the sheet or not (Step S2002). If it is confirmed that the timeout occurs (Step S2009: Y), the receiving device controller 600 transmits a sheet delay notice representing that the conveyance delay of the sheet occurs to the printer controller 900 (Step S2010). It means that in a case where the sheet is not delivered in a predetermined time after the sheet feeding is started after receiving the delivery notice from the sheet feeding device controller 700, the receiving device controller 600 determines that the abnormality occurs in the sheet feeding device 400 and informs the printer controller 900 of the occurrence of the abnormality.

The image forming apparatus 1 of the present embodiment as mentioned performs the retry operation for a predetermined number of times (in the above description, twice) if the abnormality occurs in the sheet feeding device 400 and stops the processing if the abnormality is not solved. Due to this, the image forming apparatus 1 can suppress consumption of the components by preventing unnecessary retry operation even in a case where the sheet feeding device 400 cannot detect or notice the abnormality of its own device.

Other Example of Processing of Printer Controller 900

Figure 8:
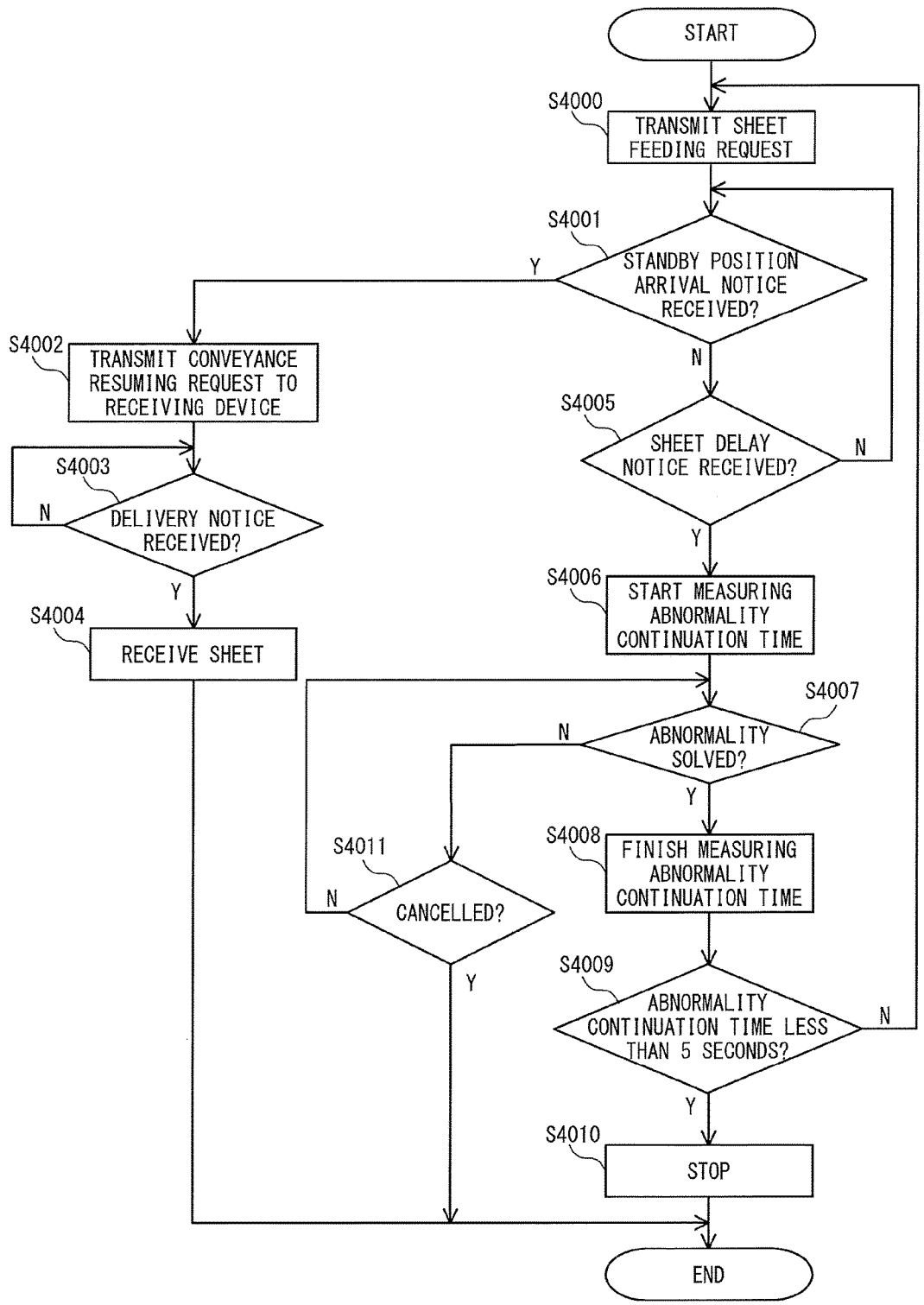
FIG. 8 is a flowchart representing another example of processing in conveying the sheet.

FIG. 8 is a flowchart representing other example of processing of the image forming apparatus 1 in conveying the sheet. In this processing, a time from when the abnormal state of the sheet feeding device 400 is detected to when the abnormality is determined to be solved is measured and whether to stop the processing or not is determined in accordance with the measurement time. For example, if the measurement time is shorter than a predetermined time, the image forming apparatus 1 determines that a device for detecting the abnormality of the sheet feeding device 400 such as the path sensor 452 fails and stops the processing. The predetermined time is a minimum time required until the abnormality is solved if the abnormality such as a jam or a failure occurs in the sheet feeding device 400. Here, setting the predetermined time as 5 seconds, a description is provided.

Similar to the processing of the step S3000 and the step S3001 in FIG. 5, the printer controller 900 transmits the sheet feeding request to the sheet feeding device controller 700 and determines whether or not the standby position arrival notice is received from the receiving device controller 600 (Steps S4000, S4001). If it is determined that the standby position arrival notice is received (Step S4001: Y), the printer controller 900 performs the similar processing to the processing of the steps S3003 and S3004 in FIG. 5. It means that the printer controller 900 transmits the conveyance resuming request of the sheet to the receiving device controller 600 and waits for the delivery notice from the receiving device controller 600 (Steps S4002, S4003: N). If the delivery notice is received from the receiving device controller 600 (Step S4003: Y), similar to the processing of the step S3005 in FIG. 5, the printer controller 900 confirms the delivery of the sheet from the receiving device 300 (Step S4004). The printer controller 900 having confirmed the delivery of the sheet controls each motor and the operation of the image forming part 80 to form the image on the sheet.

If it is determined that no standby position arrival notice is received (Step S4001: N), the printer controller 900 determines whether or not the sheet delay notice is received from the receiving device controller 600 (Step S4005). If it is determined that no sheet delay notice is received (Step S4005: N), the printer controller 900 determines whether or not the standby position arrival notice is received (Step S4001). It means that the printer controller 900 repeats the processing of the step S4001 and the step S4005 until it receives the standby position arrival notice or the sheet delay notice.

If it is determined that the sheet delay notice is received (Step S4005: Y), the printer controller 900 determines that the abnormality occurs in the sheet feeding device 400 and starts to measure an abnormality continuation time (Step S4006). The printer controller 900 determines whether the abnormal state of the sheet feeding device 400 is solved or not (whether it is in a state of receiving no abnormality detection notice or not) (Step S4007). If it is determined that the abnormal state is solved (Step S4007: Y), the printer controller 900 finishes measuring the abnormality continuation time (Step S4008). In a case where the communication path for the abnormal detection notice or the sheet feeding sensor 423 or the path sensor 452 fails, immediately after the receiving device controller 600 detects the conveyance abnormality of the sheet feeding device 400, it is in a state where no abnormality detection notice based on the sheet remaining detection is present. If no failure occurs to the communication path for the abnormality detection notice, the sheet feeding sensor 423 or the path sensor 452, the abnormality detection notice should have occurred at least 5 seconds as the user needs to remove the sheet. Then, the printer controller 900 determines whether the measurement result of the abnormality continuation time is less than the predetermined time of 5 seconds or not (Step S4009). If it is determined that the measurement result of the abnormality continuation time is less than 5 seconds (Step S4009: Y), the printer controller 900 determines that a device for detecting the abnormality of the sheet feeding device 400 or the communication path for the abnormality detection notice fails. In this case, the printer controller 900 does not transmit the sheet feeding request again and stops the operation of the image forming apparatus 1 (Step S4010). For example, the printer controller 900 stops the operation of the image forming part 80. In this case, the printer controller 900 may inform the failure of the sheet feeding device 400 through the user interface 11. If it is determined that the measurement result of the abnormality continuation time is 5 seconds or longer (Step S4009: N), the printer controller 900 transmits the sheet feeding request to the sheet feeding device controller 700 (Step S4000).

If it is determined that the abnormal state is not solved while measuring the abnormality continuation time (Step S4007: N), the printer controller 900 confirms whether there is an input from the user interface 11 or the computer 905 to cancel the print job (Step S4011). If the job cancel is obtained from the external I/F part 904 or the UI controller 906 (Step 4011: Y), the printer controller 900 ends the processing. If no job cancel is obtained from the external I/F part 904 or the UI controller 906 (Step S4011: N), the printer controller 900 determines whether the abnormal state of the sheet feeding device 400 is solved or not while measuring the abnormality continuation time (Step S4007).

The image forming apparatus 1 of the present embodiment as mentioned measures the abnormality continuation time at the occurrence of the abnormality in the sheet feeding device 400 and stops the processing if the abnormality continuation time is shorter than a predetermined time. Due to this, even in a case where the sheet feeding device 400 cannot detect the abnormality of its own device, the image forming apparatus 1 can prevent the unnecessary retry operation and suppress the consumption of the components. Further, the image forming apparatus 1 may combine and perform the processing in FIG. 5 and FIG. 8. It means that the image forming apparatus 1 stops the processing if the number of times of the retry operation is more than the predetermined number of times or if the abnormality continuation time is less than a predetermined time.

As mentioned, the image forming system of the present embodiment determines the failure of a device used to detect the abnormality of the sensor and the like of the sheet feeding device 400 in accordance with the number of times of the retry operation or the abnormality continuation time of the sheet feeding device 400 if the abnormality of the receiving device 300 is detected by a receiving device 300 side. By switching stop control in accordance with the determination result of the failure, the image forming apparatus 1 can shorten a recovery time from the abnormal stop and prevent repetition of operation and stop of the image forming system if a device for detecting the abnormality fails. Thus, the image forming apparatus 1 can suppress the unnecessary operation of the image forming part 80 and properly perform the sheet feeding processing.

It is noted that, in the above description, the sheet feeding device controller 700 transmits the delivery notice to the receiving device controller 600. Instead, the printer controller 900 may transmit the delivery request to the receiving device controller 600 after a lapse of a predetermined time after the printer controller 900 outputs the sheet feeding request. It means that the receiving device controller 600 may receive the delivery notice from the printer controller 900.

Further, the image forming system may not comprise the receiving device 300. In this case, the receiving sensor 161 of the image forming apparatus 1 functions as a device for detecting the abnormality of the sheet feeding device 400. The image forming system can perform the similar processing when feeding the sheet from the sheet feeding part 32 of the receiving device 300. In this case, the receiving sensor 161 detects the abnormality of the receiving device 300. The image forming system can perform the similar processing when feeding the sheet from the sheet feeding part 22. In this case, at least one of the pre-registration sensor 103 and the registration sensor 106 detects the abnormality of the sheet feeding part 22.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-108334, filed May 31, 2017, which is hereby incorporated by reference herein in its entirety.

What is claimed is:

1. An image forming apparatus connected to a sheet feeding apparatus that includes a feeding unit configured to feed a sheet, a first sheet detector configured to detect the sheet fed by the feeding unit, and a feed controller configured to determine a conveyance abnormality of the sheet and configured to control the feeding unit so that the feeding unit starts feeding the sheet in accordance with a sheet feeding request from the image forming apparatus, and not to notify of, even in a case where the conveyance abnormality occurs during a conveying operation of the sheet in the sheet feeding apparatus, the conveyance abnormality during the conveying operation, the image forming apparatus comprising:
  a second sheet detector configured to detect the sheet received from the sheet feeding apparatus;
  an image forming part configured to form an image on the received sheet based on a print job; and
  a controller configured to:
    transmit the sheet feeding request to the feed controller in the sheet feeding apparatus; and
    transmit the sheet feeding request to the feed controller in the sheet feeding apparatus again in a case where the second sheet detector does not detect the sheet within a predetermined time after the sheet feeding apparatus has started feeding a sheet and a signal indicating an abnormality with regard to a sheet is not received from the sheet feeding apparatus,
  wherein the controller is further configured to control the image forming part to stop performing the print job in a case where the number of times that the sheet feeding request has been transmitted exceeds a predetermined number of times.

2. The image forming apparatus according to claim 1,
wherein the controller is further configured to determine that the sheet feeding device has failed in a case where the number of times that the sheet feeding request has been transmitted exceeds the predetermined number of times.

3. The image forming apparatus according to claim 2,
wherein the controller is further configured to present notification of failure of the sheet feeding device by a predetermined user interface.

4. The image forming apparatus according to claim 3,
wherein the sheet feeding device comprises an abnormality detector and a notification part, the abnormality detector being configured to detect presence of a sheet on a conveyance path of the sheet feeding device and the notification part being configured to notify using a signal indicating that the abnormality detector detects an abnormality, and
wherein the controller is further configured to inform of failure of the abnormality detector or the notification part by the predetermined user interface.

5. The image forming apparatus according to claim 1, further comprising:
a receiving apparatus including the second sheet detector and configured to receive the sheet from the sheet feeding device and deliver the sheet to the image forming part,
wherein the receiving apparatus is further configured to transmit a delay notice indicating that sheet conveyance is delayed to the controller in a case where the sheet detector does not detect the sheet within the predetermined time after a delivery notice indicating that the sheet is to be delivered to the apparatus is received, and
wherein, in a case where the delay notice is received, the controller is further configured to:
  transmit the sheet feeding request to the sheet feeding device again in a case where the number of times that the sheet feeding request has been transmitted does not exceed the predetermined number of times; and
  stop operation of the image forming part in a case where the number of times that the sheet feeding request has been transmitted exceeds the predetermined number of times.

6. An image forming apparatus connected to a sheet feeding device, the sheet feeding device being configured to:
start feeding a sheet in accordance with a sheet feeding request;
not notify of, even in a case where a conveyance abnormality of a sheet occurs during a conveying operation of a sheet, the conveyance abnormality during the conveying operation; and
notify, in a case where an abnormality with regard to a sheet occurs while no sheet is being conveyed, using a signal indicating an abnormality,
the image forming apparatus comprising:
a sheet detector configured to detect the sheet received from the sheet feeding device;
an image forming part configured to form an image on the received sheet based on a print job; and
a controller configured to:
  transmit the sheet feeding request to the sheet feeding device;
  transmit the sheet feeding request to the sheet feeding device again in a case where the sheet detector does not detect the sheet within a first predetermined time after the sheet feeding device has started feeding a sheet and a state of the image forming apparatus is changed from a first state to a second state after further elapse of a second predetermined time, wherein the first state is a state in which the signal indicating the abnormality is received and the second state is a state in which the signal indicating the abnormality is not received; and
  transmit the sheet feeding request to the sheet feeding device and control the image forming part to stop performing the print job without transmitting the sheet feeding request in a case where the sheet detector does not detect the sheet within the first predetermined time after the sheet feeding device starts feeding a sheet and the state is changed from the first state to the second state before the second predetermined time further elapses after elapse of the first predetermined time.

7. The image forming apparatus according to claim 6,
wherein the controller is further configured to:
  transmit the sheet feeding request to the sheet feeding device;
  measure an abnormality continuation time until reception of a signal indicating the abnormality from the sheet feeding device is stopped in a case where the sheet detector does not detect the sheet within the first predetermined time after the sheet feeding device starts feeding a sheet; and
  control the image forming part to stop performing the print job in a case where a measurement result of the abnormality continuation time is less than the second predetermined time.

8. The image forming apparatus according to claim 7,
wherein the controller is further configured to inform that the sheet feeding device has failed through a predetermined user interface in a case where a time in a case where a signal indicating the abnormality is received is less than the second predetermined time.

9. The image forming apparatus according to claim 8,
wherein the sheet feeding device comprises an abnormality detector and a notification part, the abnormality detector being configured to detect presence of a sheet on a conveyance path of the sheet feeding device, and the notification part being configured to notify by issuing a signal indicating the abnormality detected by the abnormality detector to the image forming apparatus,
wherein the controller is further configured to inform of a failure of the abnormality detector or the notification part through the predetermined user interface.

10. The image forming apparatus according to claim 7, further comprising:
a receiving apparatus including the sheet detector and configured to receive the sheet from the sheet feeding device and deliver the sheet to the image forming part,
wherein the receiving apparatus is further configured to transmit a delay notice indicating that sheet conveyance is delayed to the controller in a case where the sheet detector does not detect the sheet after the first predetermined time elapses after a delivery notice indicating that the sheet is to be delivered to the apparatus is received, and
wherein the controller is further configured to:
  measure the abnormality continuation time in accordance with the delay notice;
  transmit the sheet feeding request to the sheet feeding device again in a case where a measurement result of the abnormality continuation time is not less than the second predetermined time; and stop operation of the image forming part in a case where a measurement result of the abnormality continuation time is less than the second predetermined time.

11. An image forming system comprising:
an image forming apparatus; and
a sheet feeding apparatus that includes a feeding unit configured to feed a sheet, a first sheet detector configured to detect the sheet fed by the feeding unit, and a feed controller configured to determine a conveyance abnormality of the sheet and configured to control the feeding unit so that the feeding unit starts feeding the sheet in accordance with a sheet feeding request from the image forming apparatus, and not to notify of, even in a case where the conveyance abnormality occurs during a conveying operation of the sheet in the sheet feeding apparatus, the conveyance abnormality during the conveying operation,
the image forming apparatus comprising:
a second sheet detector configured to detect the sheet received from the sheet feeding apparatus;
an image forming part configured to form an image on the received sheet based on a print job; and
a controller configured to:
  transmit the sheet feeding request to the feed controller in the sheet feeding apparatus; and
  transmit the sheet feeding request to the feed controller in the sheet feeding apparatus again in a case where the second sheet detector does not detect the sheet within a predetermined time after the sheet feeding apparatus has started feeding a sheet and a signal indicating an abnormality with regard to a sheet is not received from the sheet feeding apparatus,
wherein the controller is further configured to control the image forming part to stop performing the print job in a case where the number of times that the sheet feeding request has been transmitted exceeds a predetermined number of times.

12. An image forming system comprising:
an image forming apparatus; and
a sheet feeding device configured to:
  start feeding a sheet in accordance with a sheet feeding request;
  not notify of, even in a case where a conveyance abnormality of a sheet occurs during a conveying operation of a sheet, the conveyance abnormality during the conveying operation; and
  notify, in a case where an abnormality with regard to a sheet occurs while no sheet is being conveyed, using a signal indicating an abnormality,
wherein the image forming apparatus comprises:
  a sheet detector configured to detect the sheet which is received from the sheet feeding device;
  an image forming part configured to form an image on the sheet received based on a print job; and
  a controller configured to:
    transmit the sheet feeding request to the sheet feeding device;
    transmit the sheet feeding request to the sheet feeding device again in a case where the sheet detector does not detect the sheet within a first predetermined time after the sheet feeding device has started feeding a sheet and a state of the image forming apparatus is changed from a first state to a second state after further elapse of a second predetermined time, wherein the first state is a state in which the signal indicating the abnormality is received and the second state is a state in which the signal indicating the abnormality is not received; and
    transmit the sheet feeding request to the sheet feeding device, and control the image forming part to stop performing the print job without transmitting the sheet feeding request in a case where the sheet detector does not detect the sheet within the first predetermined time after the sheet feeding device has started feeding a sheet and the state is changed from the first state to the second state before the second predetermined time further elapses after the elapse of the first predetermined time.

13. An image forming method performed by an image forming system, the image forming system comprising:
a sheet feeding apparatus that includes a feeding unit configured to feed a sheet, a first sheet detector configured to detect the sheet fed by the feeding unit, and a feed controller configured to determine a conveyance abnormality of the sheet and configured to control the feeding unit so that the feeding unit starts feeding the sheet in accordance with a sheet feeding request from the image forming apparatus, and not to notify of, even in a case where a conveyance abnormality occurs during a conveying operation of the sheet in the sheet feeding apparatus, the conveyance abnormality during the conveying operation; and
an image forming apparatus comprising a second sheet detector and an image forming part, the second sheet detector being configured to detect the received sheet received from the sheet feeding apparatus, and the image forming part being configured to form an image on the received sheet based on a print job,
the image forming method comprising:
  transmitting, by the image forming apparatus, the sheet feeding request to the sheet feeding apparatus;
  transmitting, by the image forming apparatus, the sheet feeding request to the sheet feeding apparatus again in a case where the second sheet detector does not detect the sheet within a predetermined time after the sheet feeding apparatus has started feeding a sheet and a signal indicating an abnormality with regard to a sheet is not received from the sheet feeding apparatus; and
  stopping, by the image forming apparatus, performance of the print job in a case where the number of times the sheet feeding request is transmitted exceeds a predetermined number of times.

14. An image forming method performed by an image forming system, the image forming system comprising:
a sheet feeding device configured to:
  start feeding a sheet in accordance with a sheet feeding request;
  not to notify of, even in a case where a conveyance abnormality of a sheet occurs during a conveying operation of the sheet, the conveyance abnormality during the conveying operation; and
  notify, in a case where an abnormality with regard to a sheet occurs while no sheet is being conveyed, using a signal indicating the abnormality, and
an image forming apparatus comprising a sheet detector and an image forming part, the sheet detector being configured to detect the sheet which is received from the sheet feeding device, and the image forming part being configured to form an image on the sheet received based on a print job, the image forming method comprising:

transmitting, by the image forming apparatus, the sheet feeding request to the sheet feeding device;

transmitting, by the image forming apparatus, the sheet feeding request to the sheet feeding device again in a case where the sheet detector does not detect the sheet within a first predetermined time after the sheet feeding device has started feeding a sheet and a state of the image forming apparatus is changed from a first state to a second state after further elapse of a second predetermined time, wherein the first state is a state in which the signal indicating the abnormality is received and the second state is a state in which the signal indicating the abnormality is not received; and stopping, by the image forming apparatus, performance of the print job by the image forming part without transmitting the sheet feeding request in a case where the sheet detector does not detect the sheet within the first predetermined time after the sheet feeding device has started feeding a sheet and the state is changed from the first state to the second state before the second predetermined time further elapses after elapse of the first predetermined time.

\* \* \* \* \*